United States Patent
Ward et al.

(10) Patent No.: US 8,028,927 B2
(45) Date of Patent: Oct. 4, 2011

(54) VARIABLE RATE SPRAY NOZZLE CONTROL

(75) Inventors: Wayne Ward, Jackson, MN (US); John Peterson, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 536 days.

(21) Appl. No.: 11/854,288

(22) Filed: Sep. 12, 2007

(65) Prior Publication Data

US 2009/0065603 A1    Mar. 12, 2009

(51) Int. Cl.
*B05B 17/00* (2006.01)
(52) U.S. Cl. .............. 239/1; 239/69; 239/159; 239/163; 239/170; 239/172; 239/551
(58) Field of Classification Search .............. 239/69, 239/159, 164, 170, 172, 66, 97, 163, 551, 239/1
See application file for complete search history.

(56) References Cited

U.S. PATENT DOCUMENTS

| | | | |
|---|---|---|---|
| 4,044,952 A | | 8/1977 | Williams et al. |
| 4,220,998 A | * | 9/1980 | Kays ............................ 239/172 |
| 4,637,547 A | * | 1/1987 | Hiniker et al. .................. 239/69 |
| 5,337,959 A | * | 8/1994 | Boyd ............................. 239/172 |
| 6,126,088 A | * | 10/2000 | Wilger et al. ................. 239/551 |
| 6,173,904 B1 | * | 1/2001 | Doherty et al. ................. 239/69 |
| 6,776,355 B2 | | 8/2004 | Ringer et al. |
| 7,040,552 B2 | | 5/2006 | McCrea et al. |
| 2006/0219809 A1 | | 10/2006 | Thompson et al. |

OTHER PUBLICATIONS

International Search Report dated Mar. 20, 2009 for related PCT Application No. PCT/US2008/073297.

* cited by examiner

*Primary Examiner* — Steven J Ganey

(57) ABSTRACT

The present invention provides an advanced spray control system for controlling a sprayer, which comprises a plurality of scrolling means operatively connected to the sprayer, where the spray system offers added controllability and operability. Also provided is a method of controlling a sprayer using the spray control system of the present invention.

18 Claims, 15 Drawing Sheets

VARIABLE RATE SPRAY NOZZLE CONTROL

BACKGROUND OF THE INVENTION

1. Field of the Invention

The invention relates generally to a novel variable rate spray control device for controlling a sprayer, particularly, an agricultural sprayer.

2. Description of Related Art

Sprayers are widely used in agriculture and horticulture for applying chemicals (e.g., insecticides and fungicides) or fertilizers to crops, to protect the crops from diseases, insects, and to facilitate the growth and harvest of the crops.

Most agriculture/horticulture sprayers are designed to be mounted on or towed by a vehicle on the ground, or carried by airplanes or helicopters. These sprayers typically include one or more storage or supply vessels, a left and a right boom or other manifold systems which carry a plurality of geometrically arranged spaced nozzles along its length, a pump for pressurizing and distributing the fluid through pipes or hoses to spray nozzles, and means to control the pump, boom, and spray nozzles.

Modern agriculture/horticulture sprayers typically have a boom with multiple spray sections that can be independently controlled. Usually a master control means is used to control the entire boom, while each section may have its own control or switch (see, e.g., FIG. 1). As sprayers get larger and the number of sections and spray nozzles to be controlled increases, the spray control system, or the switching system, tends to get more cumbersome and complex. Understanding the spray control system often is difficult, and it could take considerable effort to mastering the operation of the spray control system. In addition, using a separate switch for each section of a boom requires a considerable amount of space, which prevents ideally locating the switches in a convenient location.

It is therefore desirable to provide a relatively simple, and easy to understand and operate, spray control switching system for controlling agriculture/horticulture sprayers, particularly large, multiple section sprayers.

BRIEF SUMMARY OF THE INVENTION

The present invention relates to an advanced spray control system, such as, the spray control device incorporated into the main control handle of an application machine (e.g., an agricultural sprayer). Each boom (left, center, and/or right), boom section, as well as each spray nozzle on a boom section, may be turned on/off, independently, simultaneously, sequentially, or in sync, using an infinite control device, including, without limitation, a wheel-based or a scroll-based switch.

In one aspect, the present invention provides a spray control system for controlling a sprayer having a plurality of spray units (e.g., without limitation, boom sections, or spray nozzles), which comprises a first and a second scrolling means operatively connected to the sprayer, wherein (1) the first scrolling means may change the status of the plurality of spray units in a first direction along one dimension (e.g., in a left-to-right order); (2) the second scrolling means may change the status of the plurality of spray units in a second direction along the dimension (e.g., in a right-to-left order); and (3) the first scrolling means and the second scrolling means may be selected from the group consisting of a wheel-based controlling means and a sliding switch-based controlling means (such as, without limitation, a wheel).

In one embodiment, the sprayer may contain a plurality of boom sections, and the spray control system may further comprise a plurality of boom section control means, wherein each of the boom section control means may set the status of its corresponding boom section to one of a SPRAY-ENABLED state or a SPRAY-DISABLED state.

While a boom section is at SPRAY-ENABLED state, its status may further be set to be at one of a SPRAY-ON state or a SPRAY-OFF state. In one embodiment, the status of the boom section may be controlled using at least one of the first scrolling means and the second scrolling means. In another embodiment, the spray control system may further comprise a master apply control means, wherein the master apply control means may set the status of all of the boom sections, the status of which is not set to be at a SPRAY-OFF state using at least one of the first scrolling means and the second scrolling means, to be at either a SPRAY-ON state or a SPRAY-OFF state. In yet another embodiment, the spray control system of the present invention may further comprise a reset control means, wherein the reset control means may be used to set the status of all of the boom sections which are at SPRAY-ENABLED state to be at either SPRAY-ON state or SPRAY-OFF state.

The spray control device of the present invention may optionally comprise a display means for displaying the operating status of the boom(s), e.g., the percentage that the boom is on or off, and/or the status of each section and/or nozzle during operation.

The spray control system of the present invention may further include a programmable means. In one embodiment, the scrolling device of the present invention may be configured, through using the programmable means, to operate in a pulse mode.

The present invention further provides a method for controlling a sprayer using the spray control system disclosed herein.

Other features and advantages of the present invention will become apparent from the following detailed description. It should be understood, however, that the detailed description and the specific examples, while indicating the preferred embodiments of the present invention, are given by way of illustration only, since various changes and modifications within the spirit and scope of the present invention will become apparent to those skilled in the art from this detailed description.

DETAILED DESCRIPTION OF PREFERRED EMBODIMENTS

As used herein and in the appended claims, the singular forms "a," "an," and "the" include plural references, unless the content clearly dictates otherwise. Thus, for example, reference to "a section" includes a plurality of such sections and equivalents thereof known to those skilled in the art, and reference to "the scrolling means" is a reference to one or more such scrolling means and equivalents thereof known to those skilled in the art, and so forth. All publications, patent applications, patents, and other references mentioned herein are incorporated by reference in their entirety.

Figure 1:
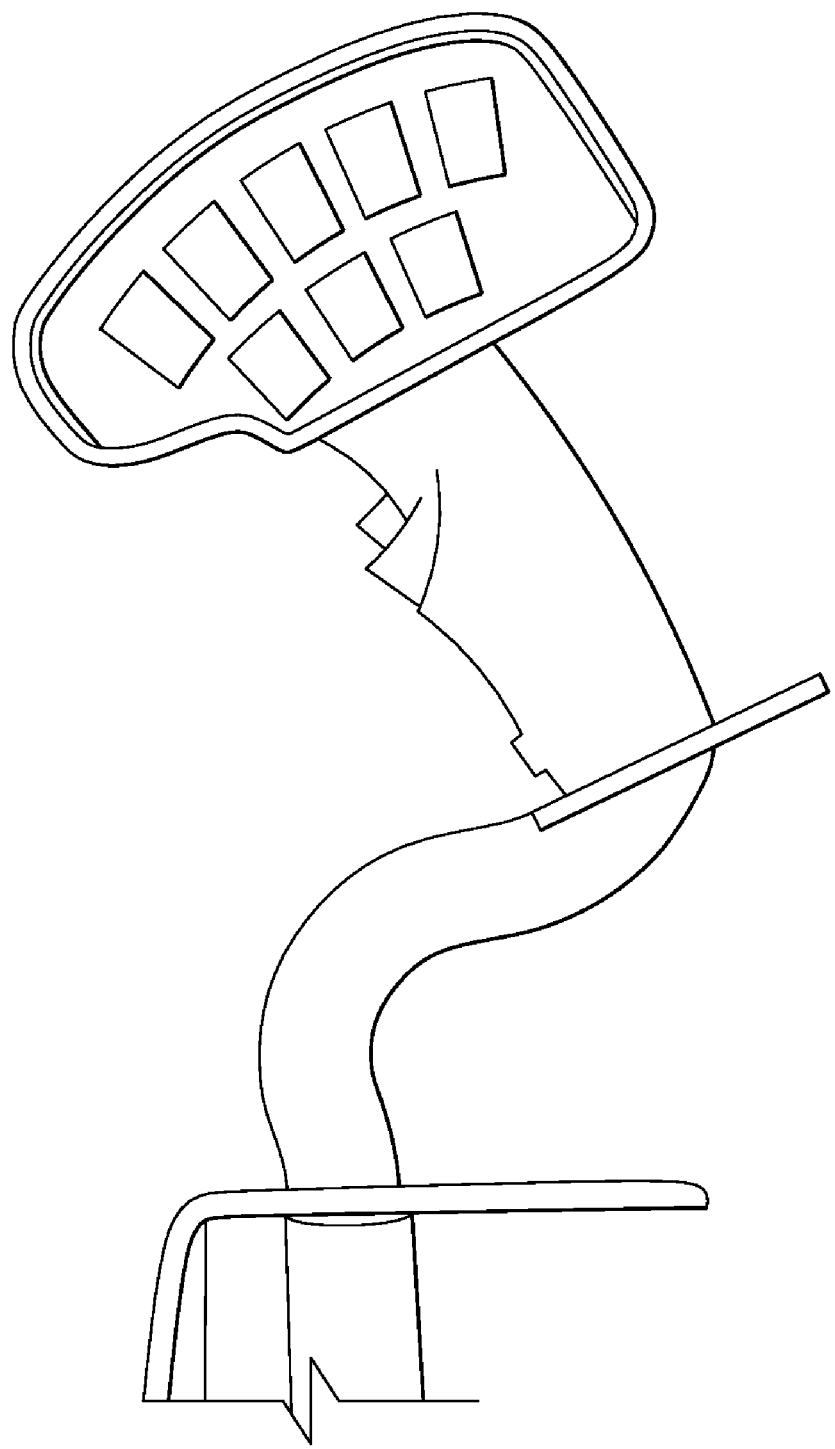
FIG. 1 shows a standard spray control system with a switch for each individual boom section.
Figure 2:
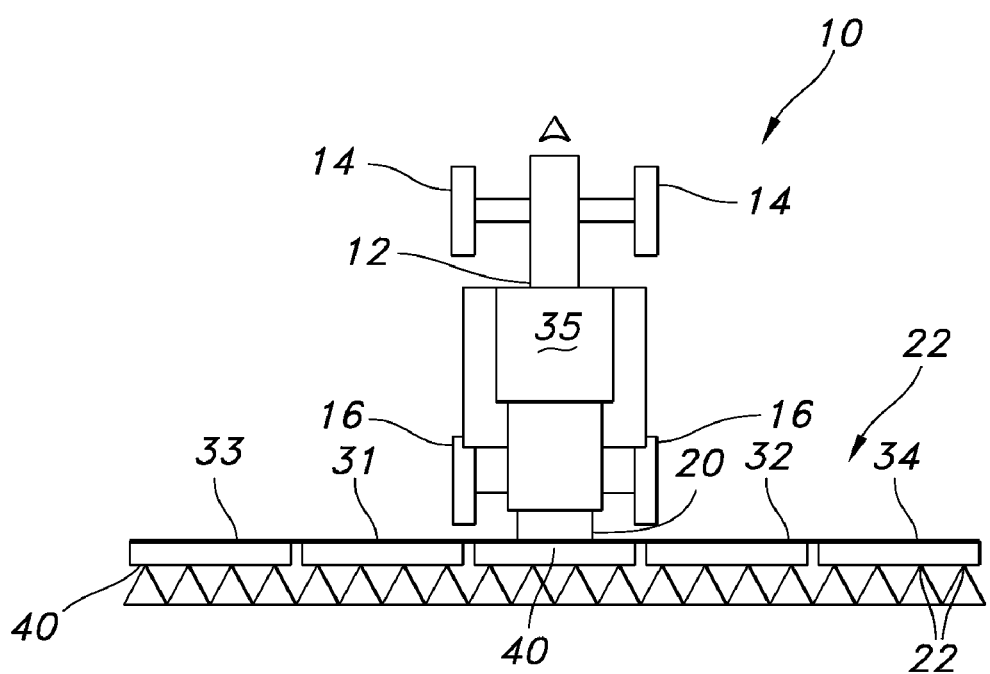
FIG. 2 shows a schematic representation of an agricultural field sprayer having multiple boom sections.

FIG. 2 shows an agricultural sprayer 10 including a main frame 12 supported for forward movement over a field by front and rear ground wheels 14 and 16 powered by a conventional hydraulic drive arrangement. A vertically adjustable boom support frame 20 is connected to the rear of the frame 12 and supports a multi-section folding boom assembly 22 shown in the fully extended field working position for spraying a wide area. The assembly 22 is shown with five boom sections 30, 31, 32, 33, and 34. The sprayer 10 may include an operator station 35 having a spray control system 70 (FIG. 4) for controlling various sprayer and boom functions including sprayer drive functions.

Figure 3:
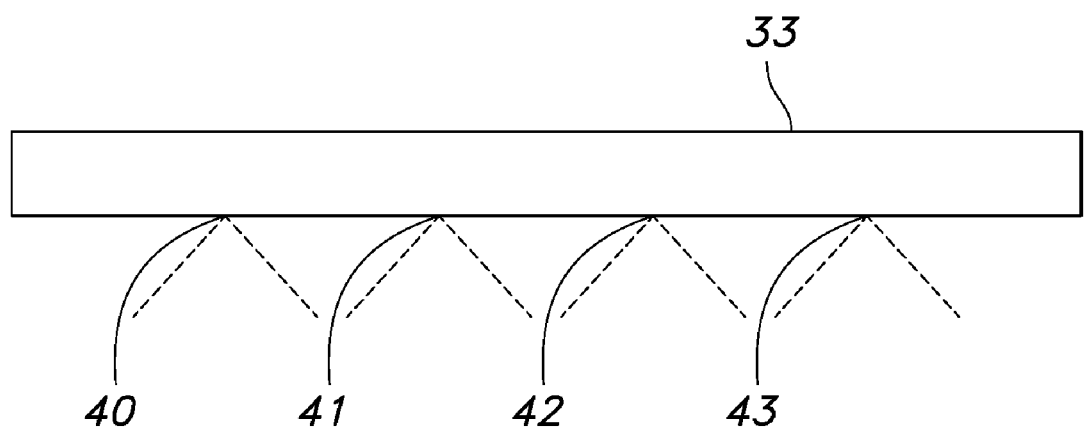
FIG. 3 shows a schematic representation of one boom section having multiple nozzles.

FIG. 3 depicts one of the boom sections (boom section 33), showing spray nozzles 40, 41, 42, and 43. In one embodiment, each of these spray nozzles may be controlled independently using the spray control system 70 of the present invention. For example, an operator of a sprayer may sequentially turn on/off spray nozzles 40, 41, 42, and 43 using the spray control system 70. In another embodiment, all the spray nozzles on the boom section 33 may be simultaneously turned on/off using the spray control system 70.

Figure 4:
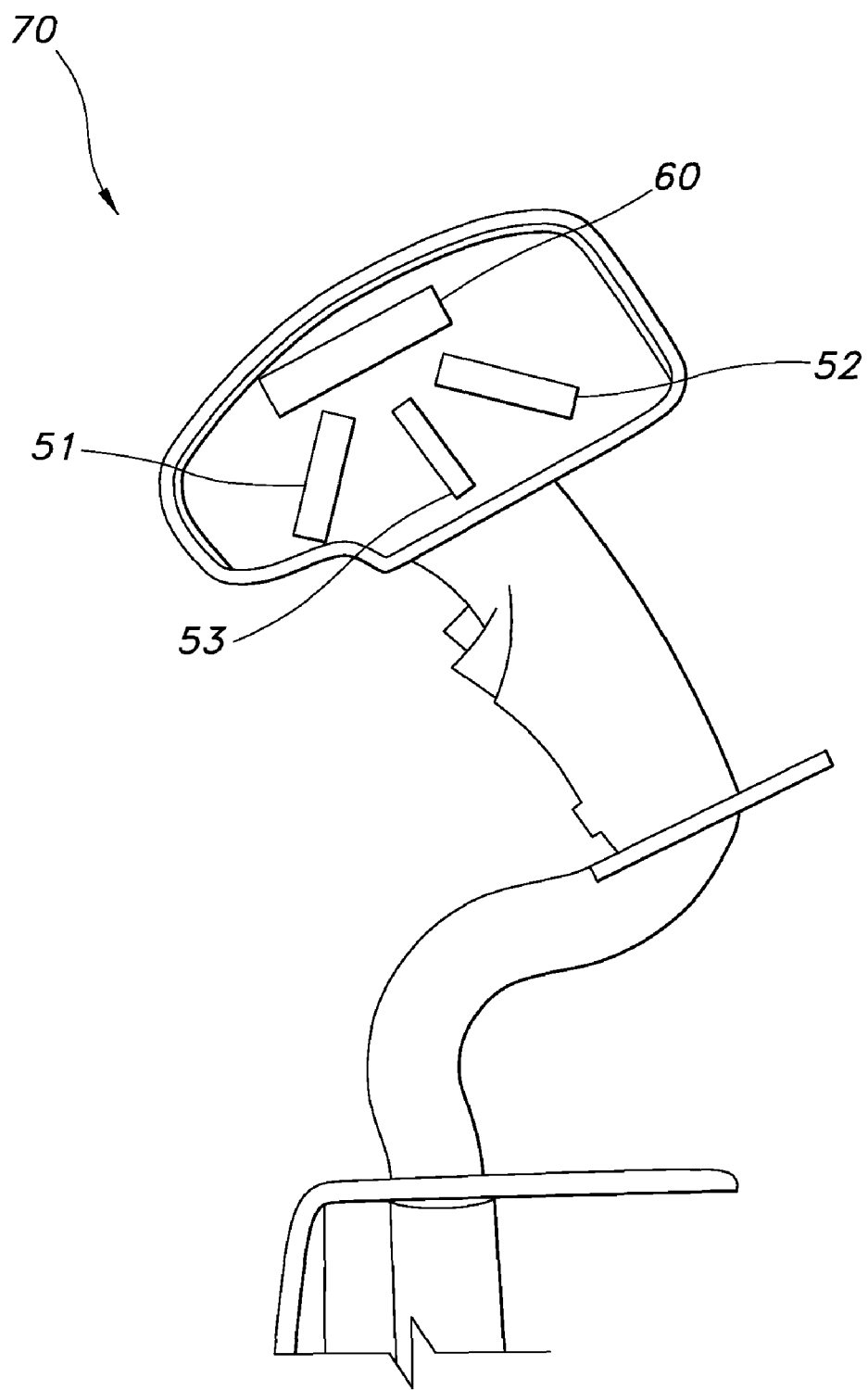
FIG. 4 shows a representative spray control system in accordance with one embodiment of the present invention.

FIG. 4 depicts a spray control system 70 having a display device 60, a lift hand ("LH") boom wheel 51, a right hand ("RH") boom wheel 52, and a center boom wheel 53, which are operatively linked to the main control handle of a sprayer.

These control wheels may afford an operator of the sprayer a plethora of, if not unlimited, options with regard to manipulating the conditions of the booms, boom sections, and/or spray nozzles of the sprayer. For instance, a boom wheel (e.g., LH boom wheel) may be set up in a mode that scrolling of the wheel may cause the change of the condition of boom sections or spray nozzles one at a time across the full length of a boom or a section of a boom. It may also be configured in a mode that scrolling the wheel may change the condition of all or a plurality of boom sections/spray nozzles. In one embodiment, the center wheel may be configured to allow the operator of the spray control system to control both booms of the sprayer. For example, the states of both booms may be reset to an all "SPRAY-ON" state or an all "SPRAY-OFF" state by pressing the center control wheel. A spray unit is at "on" or "SPRAY-ON" state when the spray unit is turned on so that materials (e.g., fertilizers, pesticides, and/or fungicides) are applied to targets of interest (e.g., crops). A spray unit is at "off" or "SPRAY-OFF" state when the spray unit is turned off and the application of materials to targets of interest is stopped.

In one aspect, the present invention provides a spray control system for controlling a sprayer having a plurality of spray units (e.g., without limitation, boom sections, or spray nozzles), which comprises a first and a second scrolling means operatively connected to the sprayer, wherein (1) the first scrolling means may change the status of the plurality of spray units in a first direction along one dimension (e.g., in a left-to-right order); (2) the second scrolling means may change the status of the plurality of spray units in a second direction along the dimension (e.g., in a right-to-left order); and (3) the first scrolling means and the second scrolling means may be selected from the group consisting of a wheel-based controlling means and a sliding switch-based controlling means (such as, without limitation, a wheel).

Figure 5:
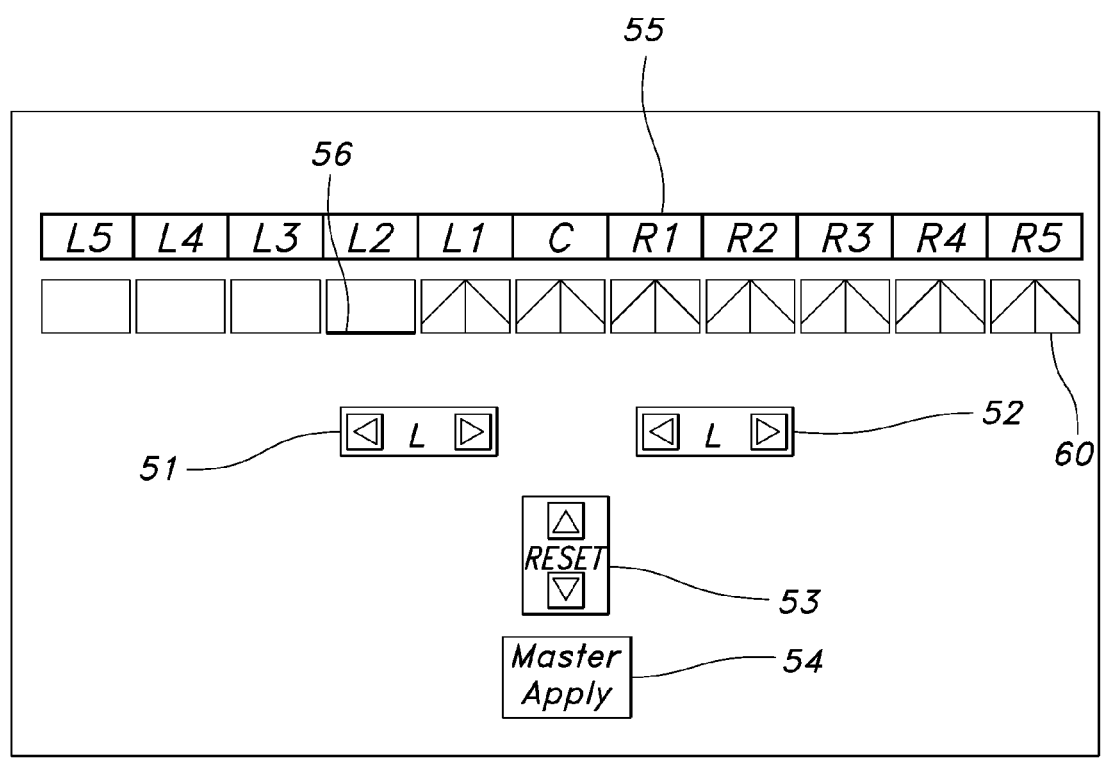
FIG. 5 shows a schematic diagram of turning on boom sections L1, C, and R1-5 of a sprayer using the LH boom wheel of a representative spray control system in accordance with one embodiment of the present invention, wherein all the boom sections are enabled.
Figure 6:
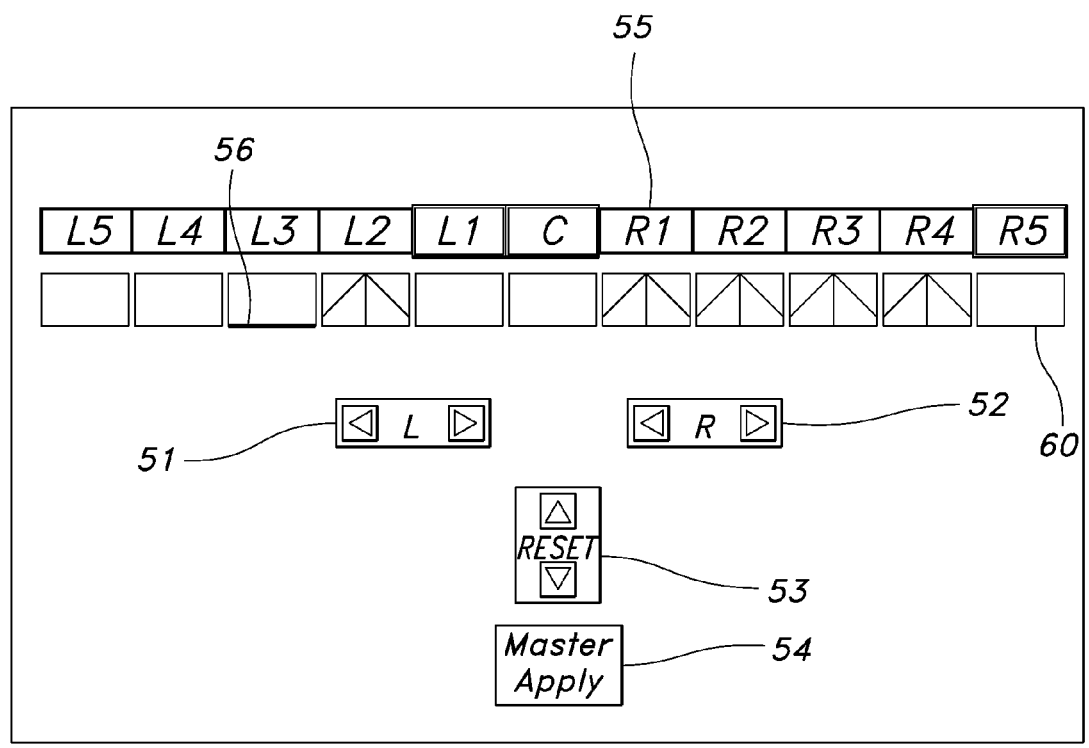
FIG. 6 shows a schematic diagram of turning on boom sections L2 and R1-4 of a sprayer using the LH boom wheel of a representative spray control system in accordance with one embodiment of the present invention, wherein boom sections C, L1, and R5 are disabled.

FIG. 5 shows a schematic diagram of a spray control system having a display device 60, a LH boom wheel 51, a RH boom wheel 52, a center/reset boom wheel 53, a master apply switch 54, and boom section switches 55 (corresponding to boom sections C, L1-5, and R1-5, respectively), which are operatively linked to the main control handle of a sprayer. The condition of the boom sections may be controlled using boom section switches 55, which may be set to be at "SPRAY-ENABLED" state or "SPRAY-DISABLED" state. A boom section may be turned on or off (i.e., be set to be at "SPRAY-ON" state or "SPRAY-OFF" state, respectively) only when the boom section is at "enabled" or "SPRAY-ENABLED" state. When a boom section is at "disabled" or "SPRAY-DISABLED" state, the boom section may not be turned on and no materials may be applied using this boom section. Curser 56 functions as an indicator, showing the present position(s) of the LH boom wheel 51 and/or the RH boom wheel 52 (see, also, FIGS. 6-10). In the present example as depicted in FIG. 5, all the boom sections are set to be at "SPRAY- ENABLED" state using boom section switches 55, while boom sections L1, C, and R1-5 are turned on using the LH boom wheel 51. In the example as depicted in FIG. 6, boom sections C, L1, and R5 are disabled using boom section switches 55, while boom sections L2 and R1-4 are turned on using the LH boom wheel 51.

Figure 7:
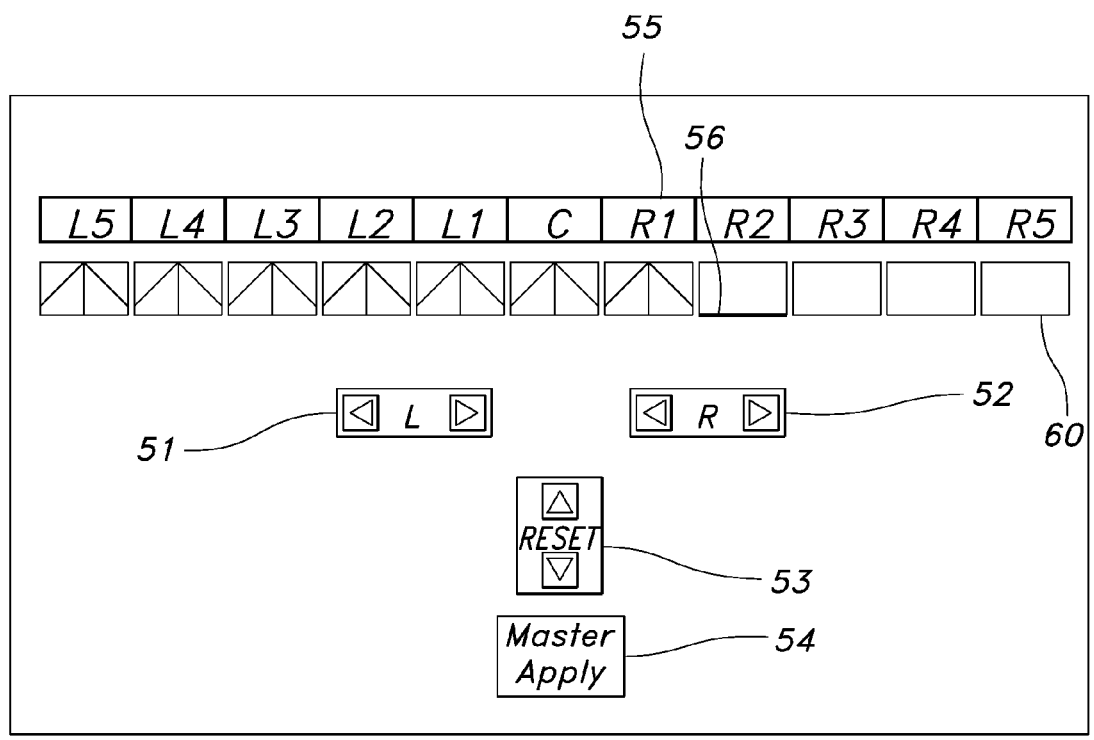
FIG. 7 shows a schematic diagram of turning on boom sections R1, C, and L1-5 of a sprayer using the RH boom wheel of a representative spray control system in accordance with one embodiment of the present invention, wherein all the boom sections are enabled.
Figure 8:
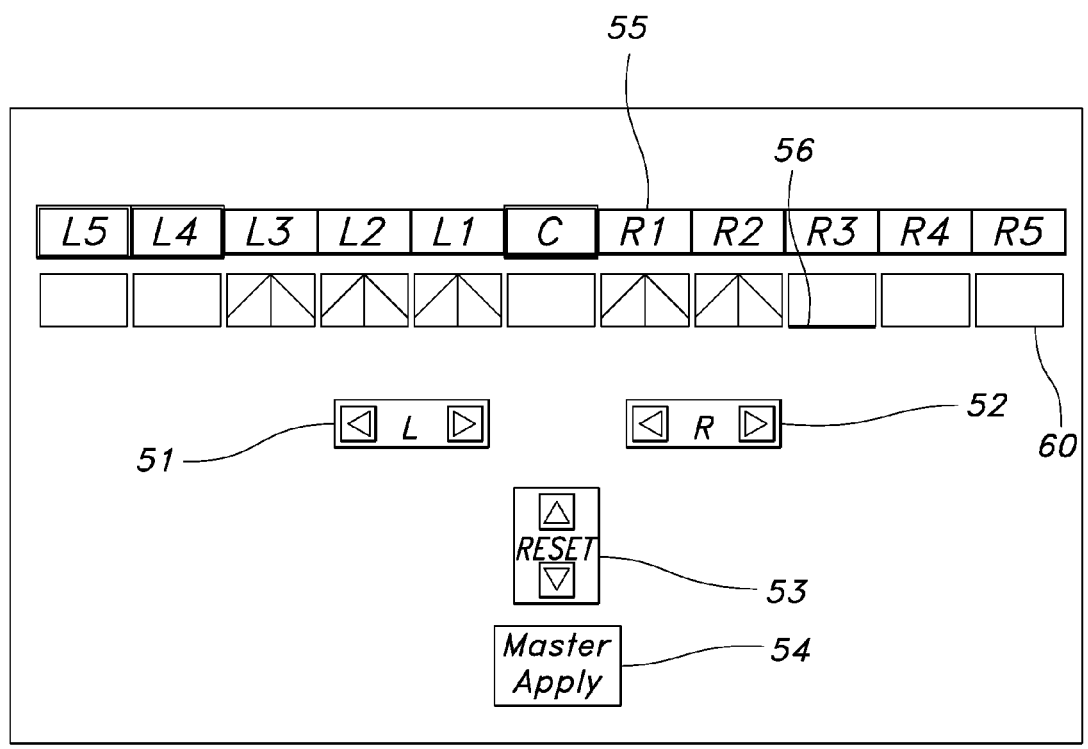
FIG. 8 shows a schematic diagraph of turning on boom sections L1-3 and R1-2 of a sprayer using the RH boom wheel of a representative spray control system in accordance with one embodiment of the present invention, wherein boom sections C, L4, and L5 are disabled.

Similarly, in the example as depicted in FIG. 7, all the boom sections are enabled using boom section switches 55, while boom sections R1, C, and L1-5 are turned on using the RH boom wheel 52. As shown in FIG. 8, boom sections C, L4, and L5 are disabled using boom section switches 55, while boom sections L1-3 and R1-2 are turned on using the RH boom wheel 52.

Figure 9:
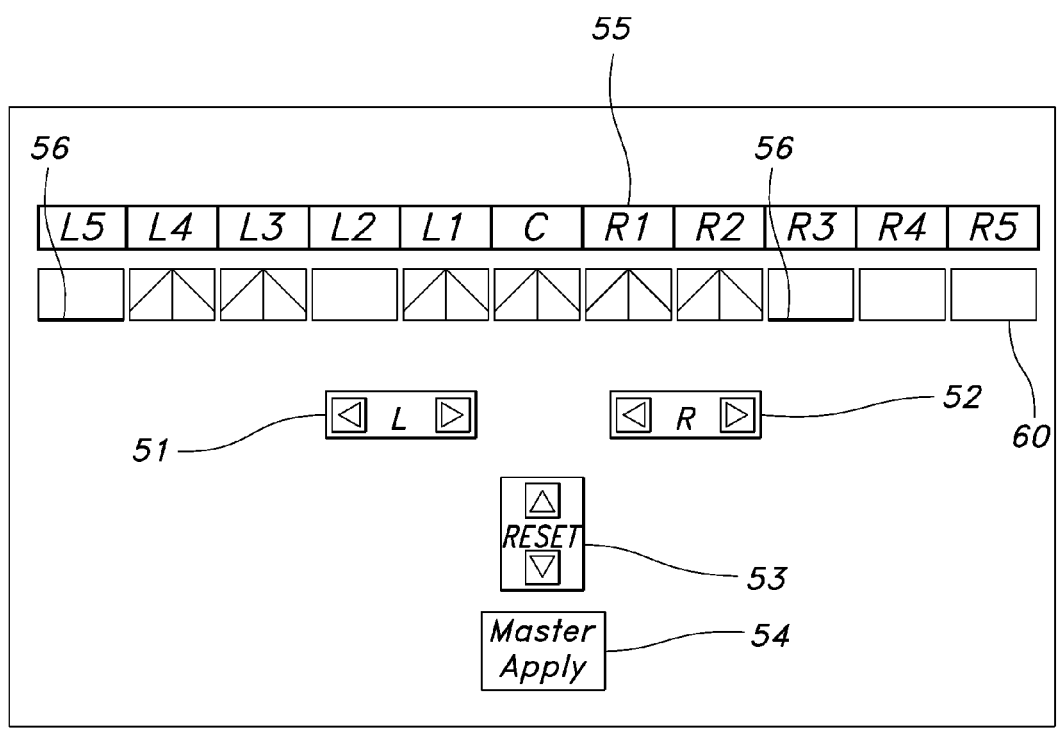
FIG. 9 shows a schematic diagraph of turning on boom sections L1, L3-4, C, and R1-2 of a sprayer using both the LH and the RH boom wheels of a representative spray control system in accordance with one embodiment of the present invention, wherein all the boom sections are enabled.
Figure 10:
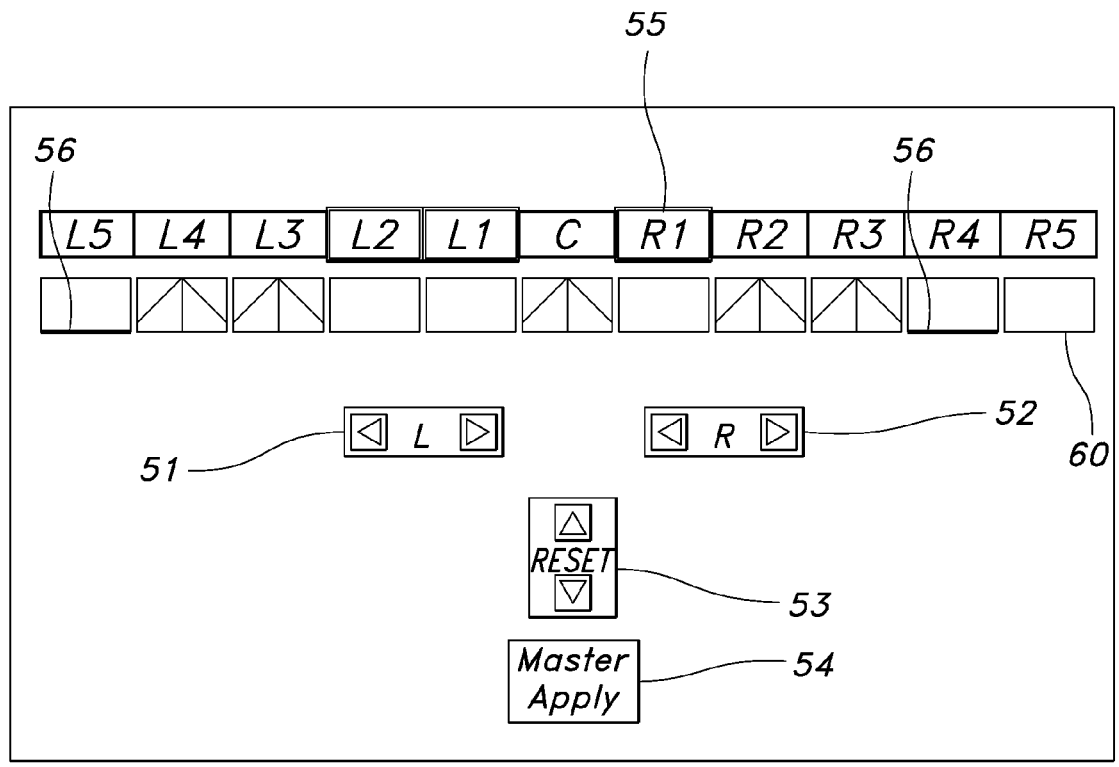
FIG. 10 shows a schematic diagraph of turning on boom sections L3-4, C, and R2-3 of a sprayer using both the LH and the RH boom wheels of a representative spray control system in accordance with one embodiment of the present invention, wherein boom sections R1 and L1-2 are disabled.

FIG. 9 shows the control of a sprayer using the spray control system in accordance with one embodiment of the present invention, wherein all the boom sections are enabled and boom sections L1, L3-4, C, and R1-2 are turned on using both the LH and the RH boom wheels 51 and 52. In the example as depicted in FIG. 10, boom sections R1 and L1-2 are disabled using boom section switches 55, while boom sections L3-4, C, and R2-3 are turned on using both the LH and the RH boom wheels 51 and 52. Cursers 56 indicate the present positions of the LH boom wheel 51 and the RH boom wheel 52. As illustrated in FIGS. 9-10, the spray control system of the present invention is capable of controlling the status of the boom sections/units from both ends of the boom. For example, the operator of the sprayer may turn off sections L2 and L5 using the LH boom wheel 51 and then turning off sections R3-5 using the RH boom wheel 52. This capability allows the operator to control boom sections or spray units individually, e.g., when entering point rows or other similar odd shaped fields (see, e.g., FIG. 15). By using both wheels the operator may have full control of the spray sections irrespective of the spray pattern needed. For instance, if the operator of the sprayer intends to spray the side of a roadway, the operator is capable of having only sections L1-5 on and also controlling each section by turning off the sections from L1 outwards or from L5 inwards. The operator may also be able to skip sections using section switches 55.

Figure 11:
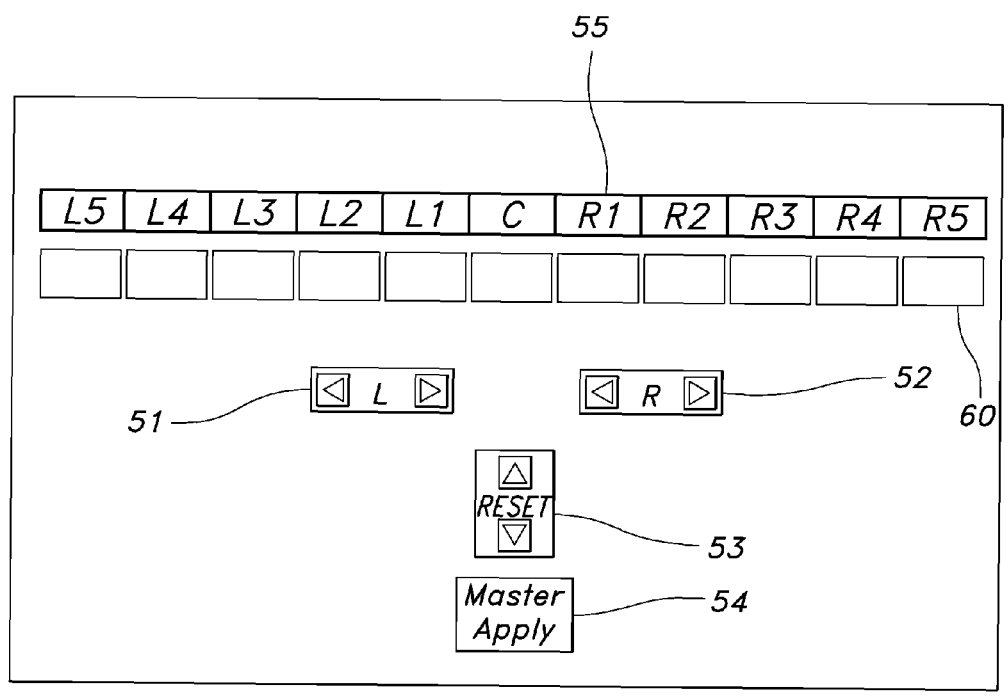
FIG. 11 shows a schematic diagraph of turning off all boom sections of a sprayer using the reset wheel of a representative spray control system in accordance with one embodiment of the present invention, wherein all the boom sections are enabled.
Figure 12:
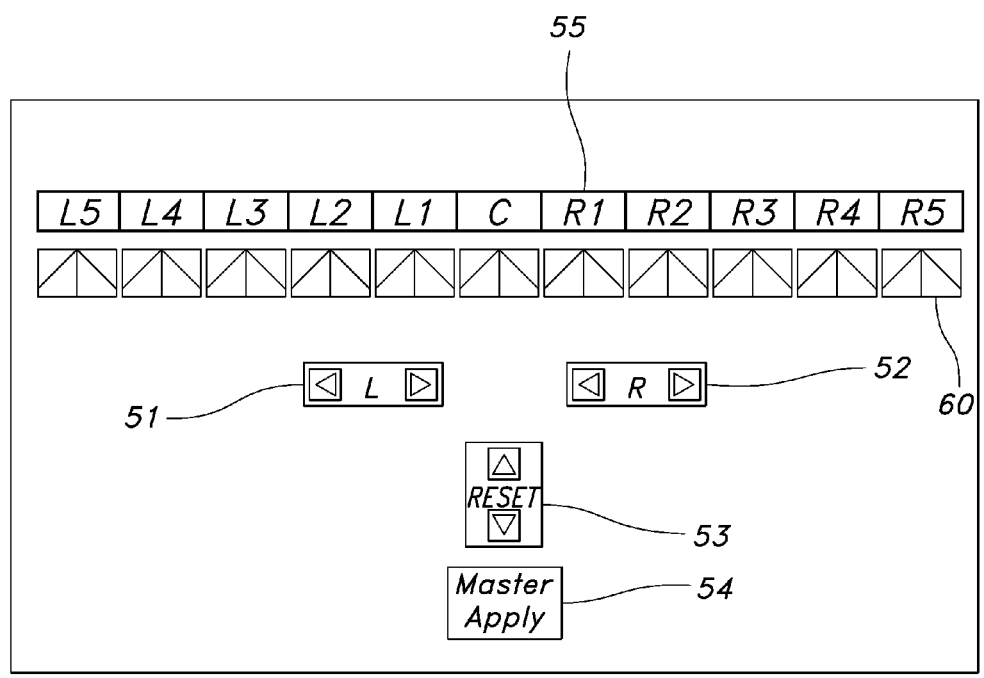
FIG. 12 shows a schematic diagraph of turning on all boom sections of a sprayer using the reset wheel of a representative spray control system in accordance with one embodiment of the present invention, wherein all the boom sections are enabled.

FIG. 11 shows the control of a sprayer using the spray control system in accordance with one embodiment of the present invention, wherein all the boom sections are enabled and wherein all boom sections are turned off using the reset wheel 53. In the example as depicted in FIG. 12, all boom sections are turned on using the reset wheel 53.

Figure 13:
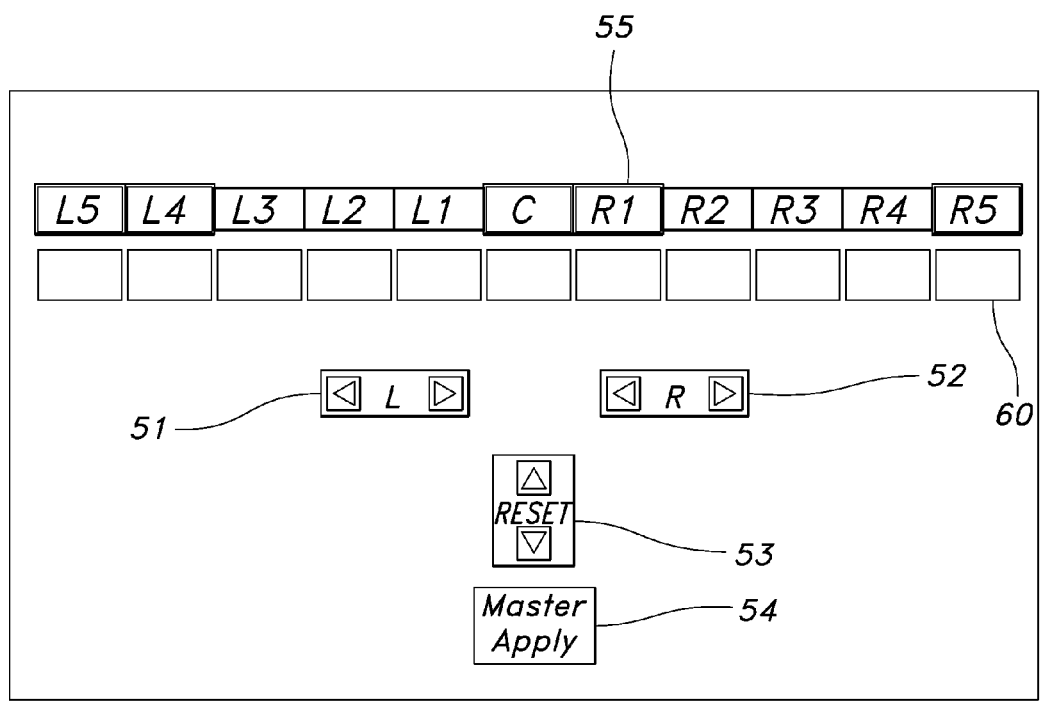
FIG. 13 shows a schematic diagraph of turning off boom sections L1-3 and R2-4 of a sprayer using the Master Apply wheel of a representative spray control system in accordance with one embodiment of the present invention, wherein boom sections C, L4-5, R1, and R5 are disabled.
Figure 14:
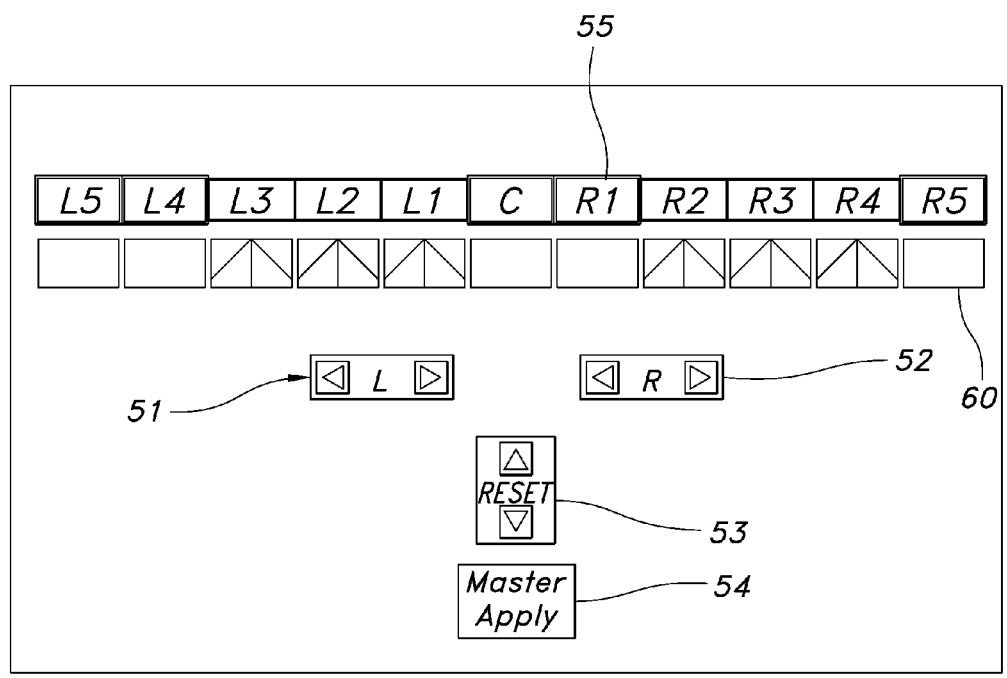
FIG. 14 shows a schematic diagraph of turning on boom sections L1-3 and R2-4 of a sprayer using the Master Apply wheel of a representative spray control system in accordance with one embodiment of the present invention, wherein boom sections C, L4-5, R1, and R5 are disabled.

FIG. 13 shows the control of a sprayer using the spray control system in accordance with one embodiment of the present invention, wherein boom sections C, L4-5, R1, and R5 are disabled using boom section switches 55 and boom sections L1-3 and R2-4 are turned off using the Master Apply wheel 54. In the example as depicted in FIG. 14, wherein boom sections C, L4-5, R1, and R5 are disabled using boom section switches 55, while boom sections L1-3 and R2-4 are turned on using the Master Apply wheel 54. Unlike the reset wheel 53 which simultaneously turns on or off all boom sections which are enabled, the Master Apply wheel 54 only turns on or off the enabled boom sections which are not previously turned off by using the LH boom wheel 51 and/or the RH boom wheel 52.

The spray control system of the present invention may be configured to receive a variety of signals from the boom wheels, including, without limitation, a scrolling signal, a push signal, a touch signal, a continuous signal, a pulse signal, and combinations thereof. The boom wheels of the present invention may be manually operated or operated through an electronically-controlled operating mechanism as disclosed herein. The resolution of the boom wheels may be adjusted, such as, without limitation, enhanced, increased, attenuated, reduced, or otherwise manipulated, using techniques known in the art.

The spray control system of the present invention may further include a programmable means, such as, without limitation, a computer-based device. The programmable means may be operatively linked to at least one of the boom wheels. In one embodiment, the scrolling device of the present invention may be configured, through using the programmable means, to operate in a pulse mode, changing the condition of at least one boom section at a programmed time interval.

In addition, the spray control device of the present invention may optionally comprise a display means for displaying the operating status of the boom(s), e.g., the percentage that the boom is on or off, and/or the status of each section during operation. Display means suitable for the purposes of the present invention are well known in the art.

Figure 15:
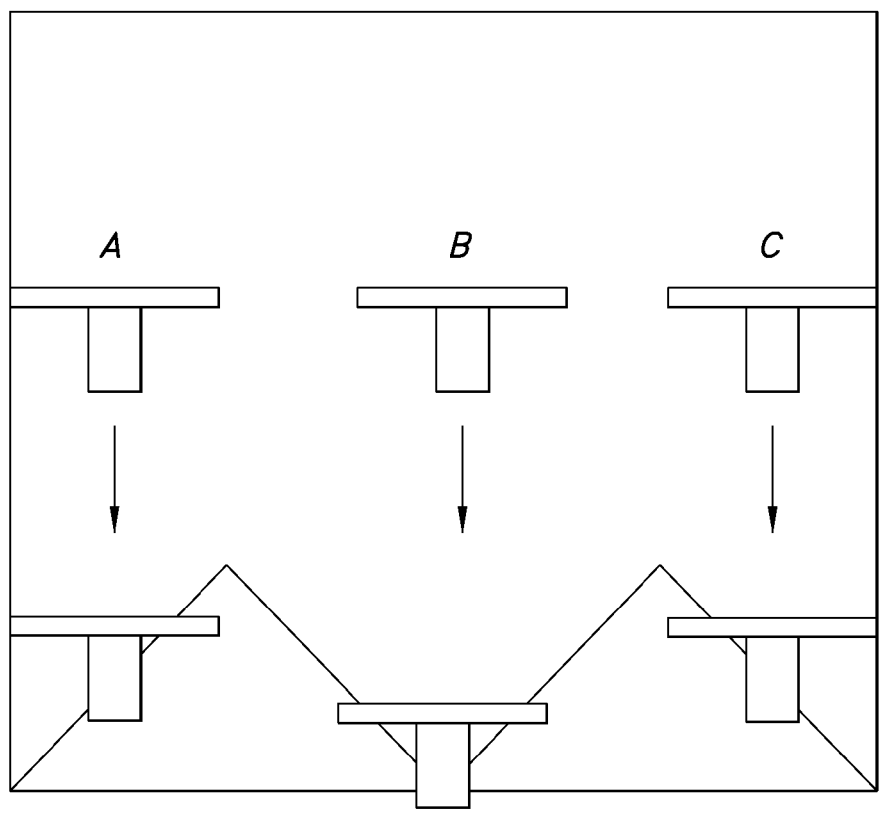
FIG. 15 shows a schematic diagraph of a sprayer operation in accordance with one embodiment of the present invention.

FIG. 15 depicts a schematic diagraph of the operation of a sprayer, which includes the spray control system of present invention, in accordance with one embodiment of the present invention. In one embodiment, a sprayer in position "A" travels along the direction of the arrow. The LH boom wheel, RH boom wheel, reset boom wheel, master apply switch, and/or boom section switches may be manipulated under this circumstance to control the state of the LH boom, turning off spray nozzles and/or boom sections gradually when entering the point row. In another embodiment, a sprayer in position "B" travels along the direction of the arrow. The LH boom wheel, RH boom wheel, reset boom wheel, master apply switch, and/or boom section switches may be manipulated to control the states of both the LH boom and the RH boom, turning off spray nozzles and/or boom sections gradually when entering the point row. In yet another embodiment, a sprayer in position "C" travels along the direction of the arrow. The LH boom wheel, RH boom wheel, reset boom wheel, master apply switch, and/or boom section switches may be manipulated under this circumstance to control the state of the RH boom, turning off spray nozzles and/or boom sections gradually when entering the point row.

Whereas this invention has been described in detail with particular reference to preferred embodiments, it is understood that variations and modifications can be effected within the spirit and scope of the invention, as described herein before and as defined in the appended claims. The corresponding structures, materials, acts, and equivalents of all means plus function elements, if any, in the claims below are intended to include any structure, material, or acts for performing the functions in combination with other claimed elements as specifically claimed.

We claim:

1. A spray control handle for controlling a sprayer having a plurality of spray units, the spray control handle comprising:
   a first control configured to:
      change a selection status of the plurality of spray units in a first direction along one dimension, and
      change an operating status of the plurality of spray units dependent upon the selection status; and
   a second control configured to:
      change the selection status of the plurality of spray units in a second direction along the one dimension, and
      change the operating status of the plurality of spray units dependent upon the selection status.

2. The spray control handle of claim 1, wherein the first control comprise a first scroll wheel and the second control comprises a second scroll wheel.

3. The spray control handle of claim 1, wherein the plurality of spray units is a plurality of boom sections, wherein the spray control system further comprises a boom section control, and wherein the boom section control sets functional states of each of the plurality of boom sections, and wherein the functional states comprise a SPRAY-ENABLED state and a SPRAY-DISABLED state.

4. The spray control handle of claim 3, wherein at least one of the plurality of boom sections is in the SPRAY-ENABLED state, and wherein the operating status comprises a SPRAY-ON state and a SPRAY-OFF state.

5. The spray control handle of claim 4, wherein at least one of the plurality of boom sections is in the SPRAY-ENABLED state, wherein the spray control system further comprises a reset control operative to change the at least one of the plurality of boom sections from the SPRAY-ON state to the SPRAY-OFF state.

6. The spray control handle of claim 3, wherein the operating status of the at least one of the plurality of boom sections is controlled using the first control.

7. The spray control handle of claim 3, wherein at least one of the plurality of boom sections has an operating status that is a a SPRAY-ON state, wherein the spray control system further comprises a master apply control operative to change at least one of the plurality of boom sections from the SPRAY-ON state to a SPRAY-OFF state.

8. The spray control handle of claim 7, wherein the master apply control is operative to change all of the plurality of boom sections from the SPRAY-OFF state to the SPRAY-ON state.

9. The spray control handle of claim 1, wherein each of the plurality of spray units is a spray nozzle.

10. The spray control handle of claim 1, wherein the spray control system further comprises a programmable device, and wherein the programmable device controls at least one of the first control and the second control.

11. The spray control system of claim 1, wherein the first control is configured to change the selection status of the plurality of spray units in the first and the second direction along the one dimension.

12. The spray control system of claim 11, wherein the second control is configured to change the selection status of the plurality of spray units in the first and the second direction along the one dimension.

13. A method for controlling a sprayer comprising a plurality of spray units, the method comprising:
changing, with a first scroll wheel, a selection status of the plurality of spray units in a first direction along one dimension;
changing, with a second scroll wheel, the selection status of the plurality of spray units in a second direction along the dimension;
changing, with at least one of the first scroll wheel and the second scroll wheel, an operating status of the plurality of spray units when the selection status of the plurality of spray units is in a desired state.

14. The method of claim 13, wherein the plurality of spray units is a plurality of boom sections, further comprising: changing the selection status of each of the plurality of boom sections.

15. The method of claim 13, further comprising:
setting a functional status of at least two spray units to a SPRAY-ENABLED state; and
changing the operating status of all the at least two enabled spray units.

16. The method of claim 13, further comprising:
resetting the operational status of all spray units.

17. A control handle of a sprayer for controlling a plurality of spray units, the spray units located on a first spray boom and second spray boom, the control handle comprising:
a plurality of booms selection switches equal in number to the plurality of spray units, each boom selection switch corresponding to a single spray unit and configured to change a functional status from SPRAY-ENABLED to SPRAY-DISABLED and from SPRAY-DISABLED to SPRAY-ENABLED;
a display configured to display a functional status of each of the plurality of spray units;
a first scroll wheel configured to:
change a position of a cursor from a first location to a second location in a first direction, the cursor indicating a selection status, and
change an operating status of the single spray unit corresponding to the boom selection switch at the first location, wherein the first scroll wheel being configured to change the operating status of the single spray unit comprises the first scroll wheel being configured to change the operating status when depressed by a user;
a second scroll wheel configured to:
change the position of the cursor from the second location to the first location, and
change the operation status of the single spray unit corresponding to the boom selection switch at the first location, wherein the second scroll wheel being configured to change the operating status of the single spray unit comprises the second scroll wheel being configured to change the operating status when depressed by the user;
a third scroll wheel configured to change the operating status of all the plurality of spray units located on the first spray boom and the second spray boom when depressed by the user; and
a reset control configured to change the operating status of all the plurality of spray units in the SPRAY-ENABLED state from a SPRAY-ON state to a SPRAY-OFF state and from the SPRAY-OFF state to the SPRAY-ON state.

18. The control handle of claim 17, further comprising a master apply scroll wheel configured to change the operating status of certain spray units of the plurality of spray units from the SPRAY-ON state to the SPRAY-OFF state and from the SPRAY-OFF state to the SPRAY-ON state, the certain spray units of the plurality of spray units comprising spray units not previously changed to the SPRAY-OFF state using the first scroll wheel and the second scroll wheel.

* * * * *